United States Patent [19]
Blichmann

[11] Patent Number: 5,908,061
[45] Date of Patent: Jun. 1, 1999

[54] PLUNGE FENCE FOR SHAPERS AND ROUTER TABLES

[76] Inventor: John Richard Blichmann, 809 S. 10th St., Lafayette, Ind. 47905

[21] Appl. No.: 09/136,807

[22] Filed: Aug. 19, 1998

[51] Int. Cl.$^6$ ................................ B27C 5/04; B27B 1/00
[52] U.S. Cl. ................................ 144/253.2; 144/135.2; 144/253.5
[58] Field of Search ............................... 33/534, 537, 538, 33/569; 83/437.1; 144/134.1, 135.2, 253.1, 253.2, 253.5

[56] References Cited

U.S. PATENT DOCUMENTS

| | | | |
|---|---|---|---|
| 1,664,969 | 4/1928 | Conover | 144/253.2 |
| 1,947,885 | 2/1934 | Tautz | 144/253.2 |
| 2,104,158 | 1/1938 | Hedgpeth | 144/253.2 |
| 4,848,203 | 7/1989 | Brooks . | |
| 5,016,358 | 5/1991 | Rice . | |
| 5,139,061 | 8/1992 | Neilson . | |
| 5,203,389 | 4/1993 | Goodwin . | |
| 5,299,609 | 4/1994 | Wedler . | |
| 5,396,937 | 3/1995 | Clausen . | |
| 5,494,089 | 2/1996 | Lubbe . | |

Primary Examiner—W. Donald Bray

[57] ABSTRACT

An improved woodworking fence system for shaper or router tables which safely, quickly, and accurately produces plunge cuts and other operations without the need to replace the standard original equipment fence and safety devices is provided. These original equipment fence and safety devices are mounted to a sliding plate which is constrained to move in linear motion toward or away from the cutter by a feed mechanism. Unlike prior art fences, the feed mechanism of the disclosed apparatus can be operated under power, thereby allowing plunge cut operations, zero clearance fence construction, biscuit joining and other similar operations to be performed. Feed stop collars and a precise measurement system are provided on the feed mechanism to accurately and repeatedly perform plunge cuts and many other woodworking operations. The precise feed and measurement system allows the operator to quickly and accurately set the desired fence position without the time consuming and wasteful iterative method required on prior art fences. Since the disclosed apparatus utilizes safety devices, jigs and fixtures already owned by the woodworker It is versatile and economical to own. The fence mounting and feed mechanism allows the apparatus to be an after-market attachment or an integral part of the shaper or router table.

16 Claims, 5 Drawing Sheets

PLUNGE FENCE FOR SHAPERS AND ROUTER TABLES

BACKGROUND—FIELD OF THE INVENTION

The present invention relates generally to shapers and router tables. In specific, it relates to a movable fence mechanism that allows safe plunge cuts into a work piece. In addition, it allows rapid and precise depth of cut control with stops for repetitive operations.

BACKGROUND—DISCUSSION OF PRIOR ART

Shapers and router tables are commonly used to machine decorative details on the surface of a work piece. The machines typically comprise a horizontal planar table mounted on legs which supports the work piece. On the under surface of this table is mounted a router, or spindle and motor assembly. The collet of the router, or spindle, protrudes through a hole in the table in a substantially vertical position. The cutter, mounted in the collet, can be vertically raised and lowered through a lever or adjustment mechanism, but cannot be adjusted in the horizontal plane. To provide a means to guide the work piece along the cutter and adjust the depth of cut, these tables are commonly fitted with a fence which can be moved toward or away from the cutter. A clamping device is provided to secure the fence when moved to it's desired location.

Prior art shaper and router table fences are difficult and time consuming to set to a desired depth of cut, requiring a manual iterative adjustment approach. A typical method to affix the fence to the table is bolting or wing nuts. Adjustment of the fence to vary depth of cut is accomplished via slots in the fence mounting holes, thereby allowing the fence to be moved toward or away from the cutter. Once the fence is manually moved to the desired position the mounting bolts are tightened. Since the fence can shift slightly during this tightening process, and since no measurement system is provided to measure cutter projection, a test piece must be used to check the fence setting. If the setting is not correct, the bolts must be readjusted. This iterative approach, and need for a test work piece, is both time consuming and wasteful. This is particularly undesirable for deep cuts requiring multiple passes of progressing depth to prevent tear out on the work piece and reduce motor overload. In addition, the fence is not adjustable daring operation of the machine. Therefore the operator must manually support the work piece during plunge cutting operations since the standard work piece safety hold down devices supplied with the machines will not function in this capacity. This manual support of the work piece presents an extreme safety hazard to the operator and also increases the likelihood of destroying the work piece. In addition, no provisions are made for repetitive cut settings for making multiple identical pieces. Another limitation of prior art fence systems is the inability to quickly and safely produce zero clearance fence wings which reduce safety hazards that are present with widely spaced fence wings.

Prior art fences exist to overcome some of these deficiencies, however, they replace the fence system that comes standard with shaper and router tables. Therefore, they are expensive to purchase and costly to manufacture. More importantly, they waste an expensive high quality component the user already possesses: the original equipment fence. Due to the limitations of standard fences, owners of shapers and router tables spend considerable resources on replacement fences such as the Incra Jig and others. These fences are micro-adjustable but are not designed to operate under power for plunge cutting. Since the original equipment fence is no longer used, the original fence mounted safety work piece hold-downs can no longer be used. To eliminate this safety hazard the owner must purchase additional costly safety work piece hold-down equipment. Yet another disadvantage of prior art replacement fences is that previously owned holding fixtures, jigs or other work-piece maneuvering devices already in the owners possession are likely to be incompatible with the replacement fence. This causes additional waste of existing tooling. Other prior art devices, such as the router table described in U.S. Pat. N0. 5,396,937 by Alan Klauss, Mar. 14, 1995 and the device described in U.S. Pat. No. 5,203,389 by Edward J. Goodwin, Nov. 6, 1992, replace the shaper or router table and fence system in it's entirety. This requires the operator to purchase and store an additional expensive machine with similar function to that already owned. Still another feature that replaecement fences do not commonly provide is a split fence, which nearly all shapers and router tables provide as standard equipment. Without this feature, the shaper and router table cannot perform jointing functions or full depth, adjustment free cuts. This forces the owner to purchase a separate jointer at considerable cost, or perform a time consuming task of disassembling the replacement fence and reinstalling the original equipment fence.

In addition to the limitations listed above, the apparatus of the present invention overcomes these deficiencies and many of the limitations and expense of prior art devices. This is accomplished by providing a means to slidably mount the existing original equipment fence supplied as standard with the router or shaper table.

SUMMARY OF THE INVENTION

It is an object of the present invention to provide a guide fence mounting device which allows the fence to be movably affixed to a router or shaper table.

It is an advantage of the invention to eliminate the need to manually support the work piece for plunge cuts. As a result, this inherent safety hazard is eliminated.

It is a feature of the invention to provide a feed mechanism with precise depth of cut control to allow the work piece to be accurately and controllably fed toward or away from the cutter.

It is another advantage of the invention to provide a feed mechanism that can be operated under power to allow safe plunge cut operations.

It is another feature of the invention to provide a feed mechanism with a depth of cut measurement device to greatly reduce tool setup time, multi-pass cut cycle time, and material waste from setup work pieces and errors.

It is another feature of the invention to provide a feed mechanism with plunge and retract stops to reduce the time required to perform repetitive cut operations.

It is another aspect of the invention to provide a low cost attachment which incorporates the existing original equipment fence and requires no modification of the existing tool. The advantages of this are maintaining split fence operation, lowering manufacturing and purchasing cost, adding machine flexibility, reducing waste of existing components, and simplifying installation for the end user.

It is another advantage of the invention to incorporate the reuse of existing work pieces hold downs & jigs the woodworker already owns. This advantage lowers ownership cost, increases versatility and increases safety.

It is another aspect of the invention to reduce manufacturing costs by eliminating the need for expensive castings, complex machined components, and excessive number of components. Preferably, the entire device should be manufacturable from inexpensive hot rolled sheet steel, or similar rigid material, formed to desired shape utilizing processes such as laser cutting, punching, stamping and folding. Other pieces could be low cost commercially available components such as screws, collars, cranks, threaded rod, etc.

It is another aspect of the invention to provide a fence attachment that can be an add-on option or an integral part of the original machine. This advantage allows shaper and router table manufacturers to sell additional products to their large base of previous buyers, or to integrate the invention into their machine and gain a competitive advantage in the market.

It is another feature of the invention to provide fence wings that allow usage with or without the plunge fence attached should the owner so desire.

It is another aspect of the invention to provide a simple means to quickly produce zero clearance fence wings for added safety.

It is another aspect of the invention to allow templates, scales and fixtures to be mounted to the present invention for the production of dovetails, finger joints and other similar woodworking joints. Further aspects, features, and advantages will become apparent from a consideration of the drawings, ensuing description, and claims.

DESCRIPTION OF THE PREFERRED EMBODIMENTS

Figure 1A:
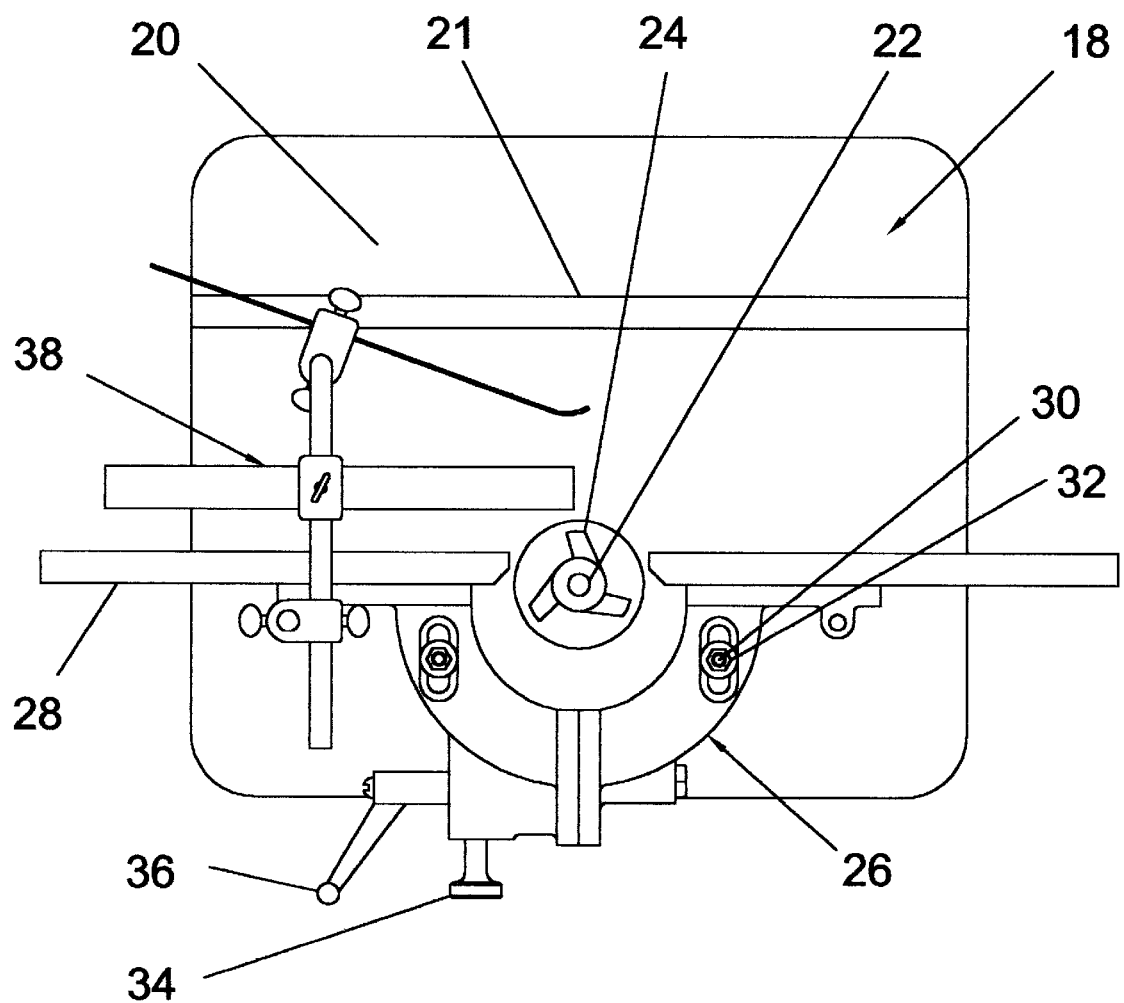
FIG. 1a and FIG. 1b are tot and rear views, respectively of a typical shaper table and serves to identify typical standard original equipment devices, features, and operation.
Figure 1B:
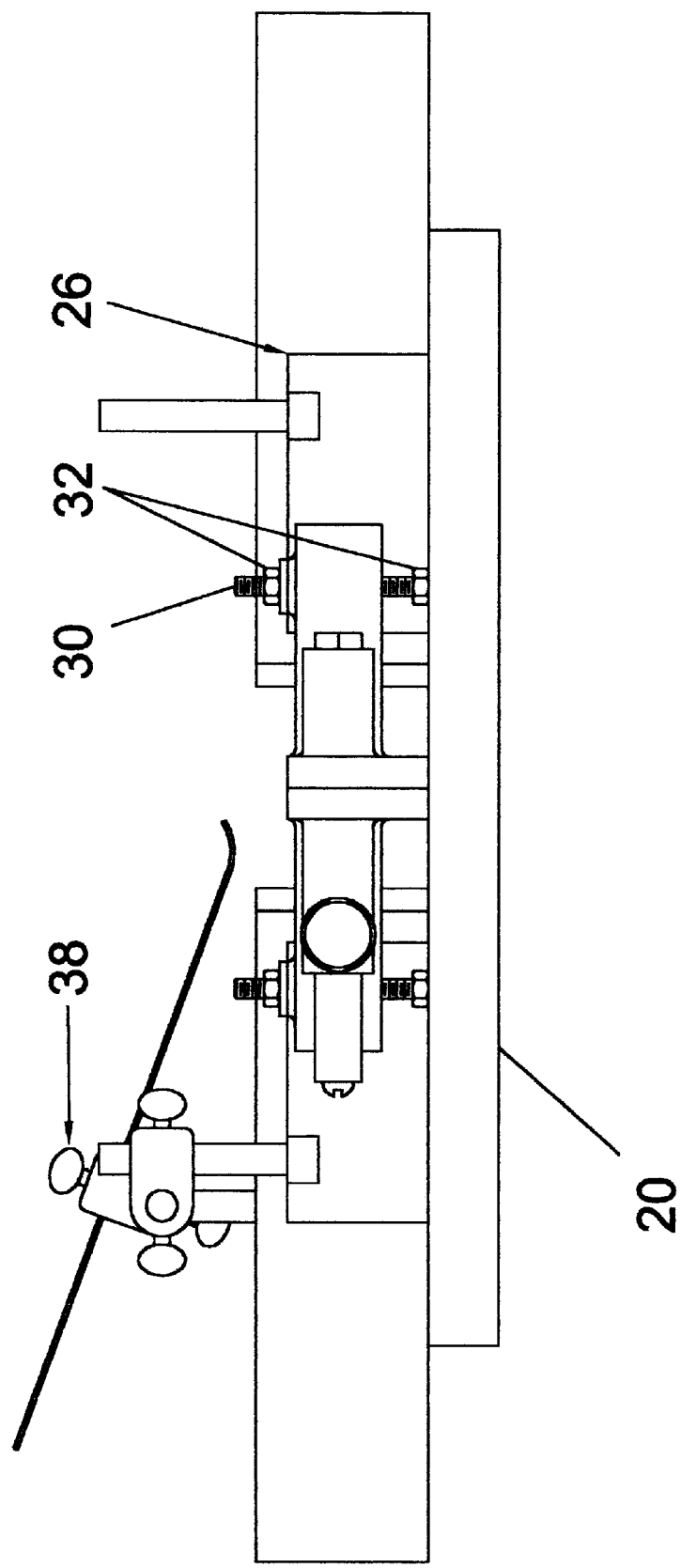

Referring to the drawings and particularly to FIG. 1a, a basic shaper assembly 18 comprises a shaper table having a generally planar table 20 with a powered, rotating spindle 22 mounted perpendicularly or anguarly to table 20. A cutter 24 mounts on spindle 22 and protrudes through the top surface of table 20. Mounted to table 20 is a typical original equipment fence assembly 26 with a pair of fence wings 28 attached to fence assembly 26. Fence assembly 26 is affixed to table 20 by a pair of fence locking studs 30 and a pair of fence locking nuts 32, shown best if FIG. 1b. Referring to FIG. 1a, a split fence adjustment knob 34 is incorporated into fence assembly 26 to allow for offsetting the fence wings 28. A locking lever 36 affixes the fence wing 28 in it's desired location. A work piece safety hold down assembly 38 is also affixed to fence assembly 26. A miter guide slot 21 is commonly provided to assist in guiding work pieces through the cutter and is oriented substantially parallel to fence wings 28.

Figure 2A:
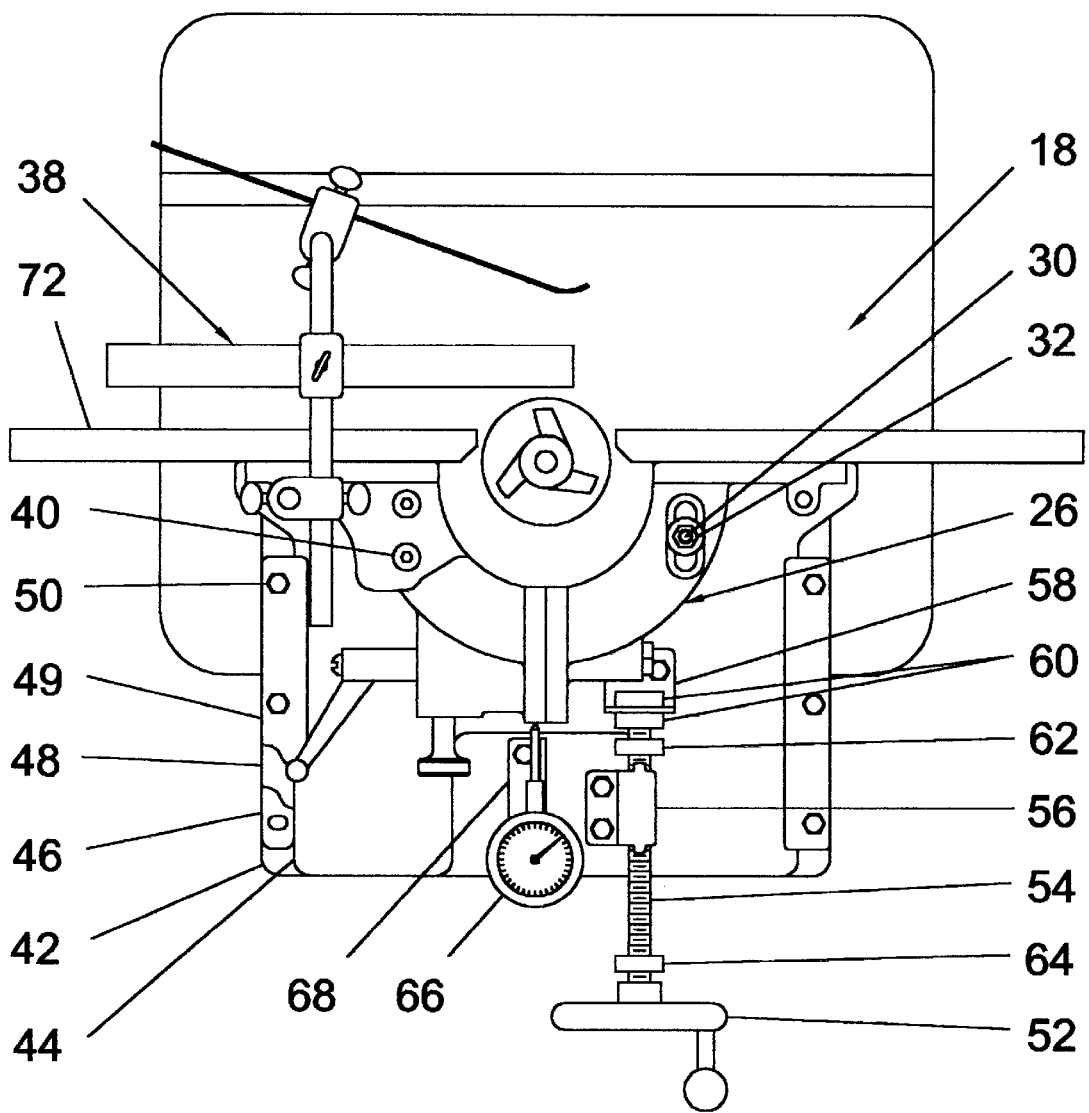
FIG. 2a and FIG. 2b are top and rear views, respectively, of aforementioned shaper table, as indicated in FIG. 1a and FIG. 1b, with the preferred embodiment of present invention installed on it's surface. The crank handle and dial indicator have been removed in FIG. 2b for improved clarity.

Referring to FIG. 2a, the preferred embodiment of the plunge fence of the present apparatus comprises a base plate 42 and a slide plate 44. After removal of fence assembly 26, base plate 42 is affixed to top surface of table 20 with base plate screws 40, preferably utilizing the threaded holes in table 20 previously used to affix fence assembly 26 to table 20.

Figure 2B:
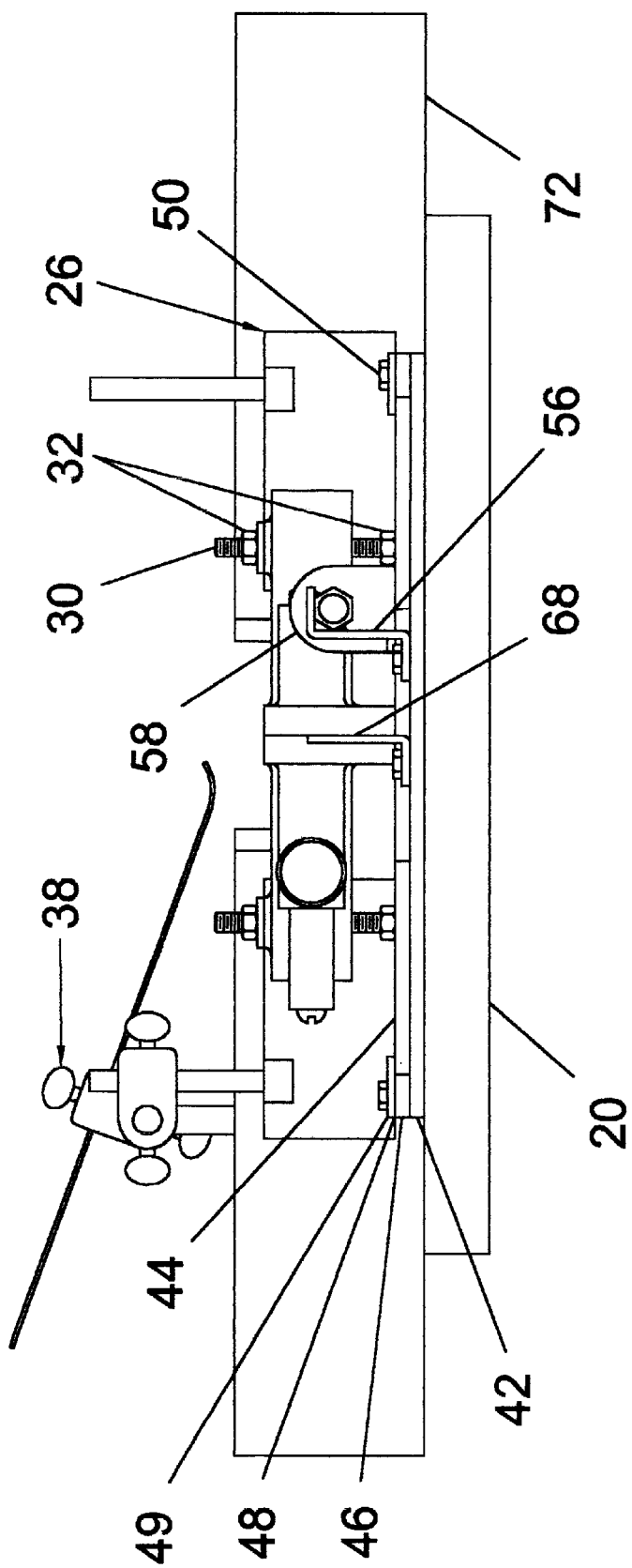

Best shown in FIG. 2b, slide plate 44 is slidably affixed to base plate 42 with a feed guide rail 46. Feed guide rail 46 is made preferably from material identical in thickness to slide plate 44, although other materials can be used. Feed guide rail 46 also has a series of slotted holes to receive feed guide screws 50. Referring to FIG. 2a, the slotted holes in feed guide rail 46 provide alignment adjustment for fence assembly 26 with respect to miter guide slot 21. In addition, the aforementioned slots allow adjustment of clearance between feed guide rail 46 and slide plate 44, thereby allowing smooth relative motion between these components and minimizing rotational motion of slide plates 44. A feed guide flange 49, having a series of holes to receive feed guide screws 50, restrains slide plate 44 to motion in a plane parallel to table 20. Feed guide shim 48, placed on top of feed guide rail 46, is of sufficient thickness approximately 0.001 to 0.050 in, preferably 0.005 in) to allow smooth relative motion between slide plate 44, base plate 42, and feed guide flange 49, as well as minimizing motion in the plane perpendicular to table 20. Alternately, shim 48 could be eliminated by reducing height of base plate 42, or increasing the height of feed guide rail 46, by the height of shim 48. A series of feed guide screws 50 affixes rail 46, shim 48, and flange 49 to base slate 42. In summary, feed guide assembly serves to provide a single degree of motion toward or away from spindle 22 with minimal movement in all other planes.

A feed crank 52 is affixed to a threaded feed screw 54. Feed screw 54 is threaded into a feed screw support 56 which is affixed to base plate 42. A pair of feed screw collars 60 are affixed to feed screw 50 to allow feed screw 50 to rotate within a hole in a fence feed bracket 58. Fence feed bracket 58 is affixed to slide plate 44. A plunge stop collar 62 and a retract stop collar 64 are threadedly received into feed screw 54 on opposite sides of feed screw support 56.

A dial indicator 66 is movably affixed to base plate 42 with a dial indicator support bracket 68. A plunge fence wing 72 is bolted to fence assembly 26. Fence wing 72 has a series of mounting holes offset by the thickness of base plate 42. This offset increases versatility by allowing the wings to be inverted and reinstalled on fence assembly 26 without the present invention installed.

Operation Of The Preferred Embodiment

Figure 3A:
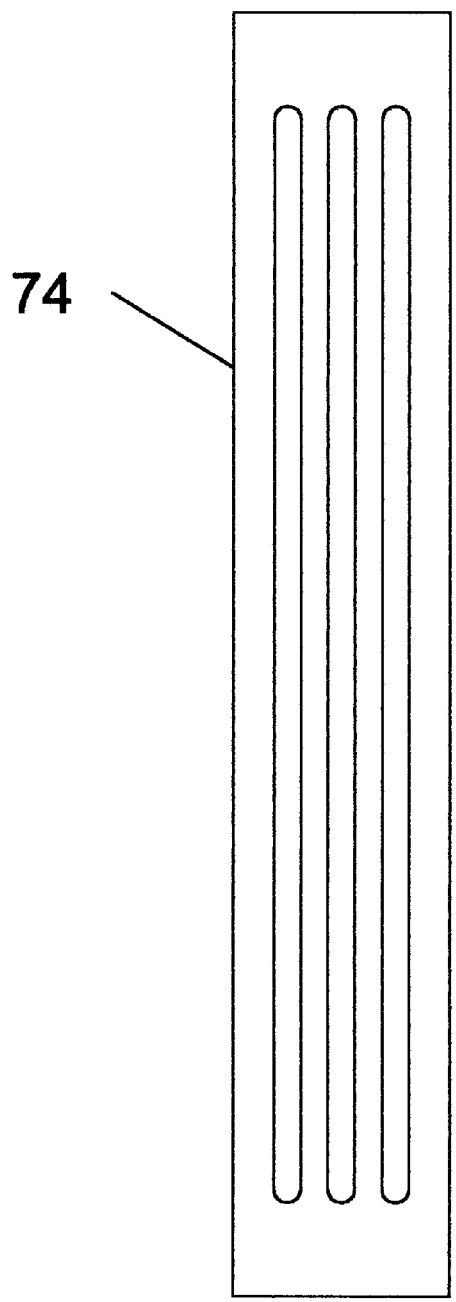
FIG. 3a and FIG. 3b are front and side views, respectively, of a work piece showing finished plunge cuts.
Figure 3B:
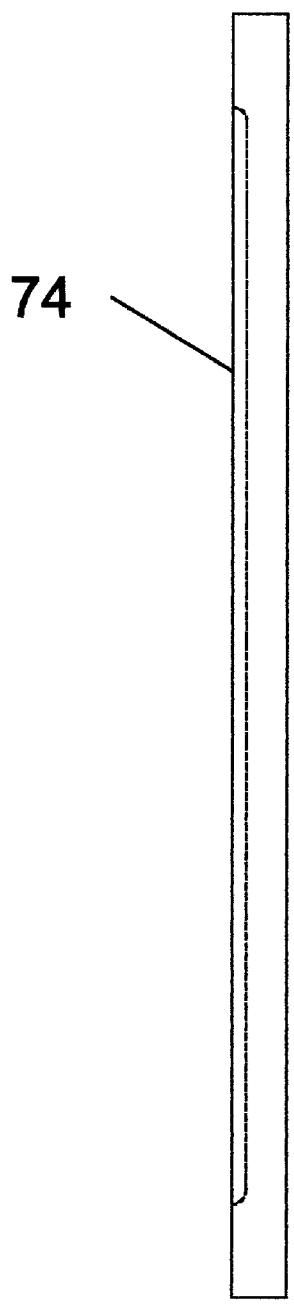

The preferred embodiment or the present apparatus is utilized to produce plunge cuts a sample of which (fluted board) is shown in FIG. 3a and FIG. 3b. In addition, the plunge fence is capable of producing extremely precise repetitive cuts with a very short tool setup time. Shown best in FIG. 1a, the plunge fence also allows usage of the original equipment fence assembly 26 and previously owned safety hold down devices such as work piece safety hold-down assembly 38, as well as other previously owned jigs & devices. As such, versatility is increased and owning costs are lowered. Lastly, all of the features of fence 26 are maintained.

After installation of plunge fence on table 20, shown best in FIG. 2a, feed guide screws 50 are loosened and the front edge of slide plate 44 is adjusted until it is parallel with miter gage slot 21. The feed guide screws 50 are then tightened to maintain this parallel relationship and do not require further adjustment.

After installation of cutter 24 onto spindle 22, cutter apex must be made tangent (flush) with the face of the plunge fence wings 72. This is accomplished by placing a planar object such as a straightedge or flat block of wood against plunge fence wings 72 and turning feed crank 52 until cutter apex just contacts the planar surface. Adjust position of dial indicator 66 until it reads zero. The fence is now properly zeroed with respect to cutter 24 and feed crank 52 car be repetitively moved with no further adjustment unless a different cutter is installed.

Plunge stop collar 62 is used to stop the feed crank 52 at the desired depth of cut, allow for repetitive cut operations, and to allow the operator to focus on the work piece instead of dial indicator 66. Plunge stop collar 62 is set by turning feed crank 52 until dial indicator 66 reads the desired depth of cut. Plunge stop collar 62 is then moved against feed screw support 56 and then tightened. Retract stop collar 64 is used to reduce repetitive cut cycle time by minimizing excessive overshoot of the zero posit ion, and indicates to the operator that the cutter is completely and safely retracted behind plunge fence wings 72. The retract stop collar 64 is set by turning feed crank 52 until the apex of cutter 24 is behind plunge fence wings 72, approximately ¼ inch. Retract stop collar 64 is them moved against feed screw support 56 and then tightened.

To produce a plunge cut shown in FIG. 3, feed crank 52 is turned until retract stop collar 64 engages feed screw support 56. Best shown in FIG. 2a, plunge cut example work piece 74 is then placed against plunge fence wings 12, held against plunge fence wings 72 by work piece safety hold down assembly 38, and moved into desired position. The shaper power is then turned on and feed crank 52 is rotated, plunging cutter work piece 74 into cutter 24 , until plunge stop collar 62 engages feed screw support 56, thereby locking fence assembly 26 into position. The work piece is then pushed forward through cuter 24 with a push-stick or similar safety device until the desired stop location is reached Feed crank 52 is then turned until retract stop collar 64 engages feed screw support 56. The shaper power is then turned off and the work piece can be safely removed.

The plunge fence can be used to greatly reduce the long setup time and imprecise depth of cut control experienced with manually adjusted fence systems. Once cutter 24 is installed on shaper spindle 22 and dial indicator 66 zeroed as described above, any desired depth of cut can be set quickly and very precisely by turning feed crank 52 until dial indicator 66 reads the desired value.

Zero clearance fence wings, used to reduce kickback and improve cut quality, are produced by removing plunge fence wings 72 from original equipment fence assembly 26 and mounting a single piece fence wing in its place. Cutter 24 is then plunged through the single piece fence wing as described above thereby producing a perfectly matching profile to the cutter.

In addition, deep cut operations requiring multiple passes can be executed quickly by setting plunge stop collar 62 to desired value as described above. Passes of increasing depth can be made by turning feed crank 52 to desired partial depth location. Final pass is made by turning feed crank 52 until plunge stop collar 62 engages feed screw support 56.

A final feature is gained by mounting a plate cutter gig (biscuit joint), box joint jig, dovetail jig, mortising jig, template or scale to fence 26. A, previously described in the plunge cut operation, desired depth of cut and cutter height can be adjusted utilizing plunge stop collar 62 and retract stop collar 64 as required by then jig being used. A work piece is then placed into proper position as required by the jig or template and clamped to fence 26. The shaper or router power is turned on, plunged forward, retracted, and then power is turned off. The work piece car then be unclamped, indexed to the next position, and cut again.

As described herein, the plunge fence is a highly versatile, inexpensive, safe and precise wood working tool. It allows reuse of standard equipment supplied with router tables and shapers such as the fence assembly and safety hold downs. Yet it is flexible enough to allow mounting of special tooling, jigs and fixtures which may already owned by the woodworker. The invention can easily be modified and adapted to mount on any shaper or router table. Alternately, it can be supplied as an integral part of the router table or shaper by eliminating the base plate 42 and mounting the feed guide means and slide plate 44 directly to table 20. While the guide means of the preferred embodiment shown in the drawings was designed to be cost effective to manufacture, the feed guide shims 48, shown best in FIG. 2a, could be eliminated by reducing the height of base plates 42, or increasing the height of feed guide rail 46 by the thickness of feed guide shim 48. The means in which the fence is constrained to move in linear motion could be performed by linear bearings, machined guide rails, nested tubes, bolts running in close fitting slots, and many other similar means. The feed means could also be accomplished by several methods including, but not limited to, levers, gears, and hydraulic or pneumatic cylinders. Measurement means could be provided by a dial indicator, vernier or dial caliper, tape measure or similar measurement methods. It also possible to provide functionality of the present invention without including a measurement means and or plunge stop or retract means. Albeit less desirable, the device could be designed such that the standard original equipment fence, safety devices, and other equipment are not reused and supplied with the plunge fence or left to the machine owner to procure and adapt.

Although the above description contains many specifities, these should not be construed as limiting the scope of the invention but as merely providing illustrations of some of the presently preferred embodiments of this invention. For example, many methods can be employed to provide single degree of motion, plunging & retracting, and mounting to the shaper or router table. In addition, numerous other applications are possible.

Thus, the scope of the invention should be determined by the appended claims and their equivalents, rather than by the examples given.

I claim:

1. A fence apparatus for a power machine comprising:
    a slide plate adapted to be attached to a work surface of said power machine;
    a fence assembly moveably disposed relative to said slide plate;
    a feed guide member connected to said work surface and adapted to guide said fence assembly along said slide plate in a prescribed direction; and
    an actuating device for moving said fence assembly along said slide plate in said prescribed direction.

2. The fence apparatus of claim 1 further comprising a base plate rigidly attached to said work surface and slideably coupled to said slide plate to allow movement of said slide plate in said prescribed direction.

3. The fence apparatus of claim 2 wherein said fence assembly further includes a pair of fence wings attached to said fence assembly.

4. The fence apparatus of claim 1 wherein said guide member further includes a pair of side members attached to said slide plate and adapted to prevent rotation of said fence assembly along the plane of said slide plate.

5. The fence apparatus of claim 1 wherein said guide member further includes a top retaining member disposed generally parallel to said slide plate and adapted to prevent movement of said fence assembly off the plane of said slide plate.

6. The fence apparatus of claim 1 wherein said actuating device is a feed crank rotatably affixed to said fence assembly and adapted for moving said fence assembly along said slide plate in said prescribed direction.

7. The fence apparatus of claim 6 wherein said feed crank includes a stop collar adapted to s op said fence assembly at a desired position.

8. The fence apparatus of claim 7 wherein said feed crank includes a second stop collar adapted to stop said fence assembly at a second desired position.

9. The fence apparatus of claim 6 wherein said feed crank includes a device for indicating the position of said fence assembly relative to a reference point on said power machine.

10. A power machine having a moveable fence apparatus, comprising:

a work surface having an opening;

a powered rotating spindle extending through said opening in said work surface;

a cutting device attached to said powered rotating spindle;

a slide plate adapted to be attached to said work surface proximate said cutting device and in a generally parallel orientation with said work surface;

a fence assembly moveably disposed on said slide plate;

a feed guide member connected to said work surface and adapted to guide said fence assembly along said plate in a prescribed direction along the plane of said work surface and slide plate; and an actuating device for moving said fence assembly along said slide plate in said prescribed direction while said powered spindle is operating.

11. The fence apparatus of claim 10 further comprising a base plate rigidly attached to said work surface and wherein said slide plate is moveably disposed on said base plate in said prescribed direction.

12. The fence apparatus of claim 10 wherein said guide member further includes a pair of side members attached to said slide plate and adapted to prevent rotation of said fence assembly along the plane of said working surface and slide plate.

13. The fence apparatus of claim 10 wherein said guide member further includes a top retaining member disposed generally parallel to said slide plate and adapted to prevent movement of said fence assembly off the plane of said slide plate.

14. The fence apparatus of claim 10 wherein said actuating device is a feed crank rotatably affixed to said fence assembly and adapted for moving sail fence assembly along said slide plate in said prescribed direction.

15. The fence apparatus of claim 14 wherein said feed crank includes a firs, stop collar adapted to stop said fence assembly at a first desired position corresponding to a depth of cut position and a second stop collar adapted to stop said fence assembly at a second desired position corresponding to a retracted position.

16. The fence apparatus of claim 14 wherein said feed crank includes a device for indicating the position of said fence assembly relative to said cutting device.

* * * * *